United States Patent
Overbergh et al.

(10) Patent No.: US 6,395,988 B1
(45) Date of Patent: May 28, 2002

(54) METHODS AND ARTICLES FOR ENCLOSING AN ELONGATE SUBSTRATE USING POLYMERIC SEALING MATERIALS WITH DIFFERENT SOFTENING POINTS AND MELT VISCOSITIES

(75) Inventors: Noel Overbergh, Rotselaar; Jean-Marie Etienne Nolf, Korbeek-Lo; Bart Van Meeuwen, Molenstede, all of (BE); Ralf Lietzke, Anzing (DE); Peter Van Overmeir, Heverlee (BE)

(73) Assignee: Tyco Electronics Raychem NV, Kessel-Lo (BE)

( * ) Notice: Subject to any disclaimer, the term of this patent is extended or adjusted under 35 U.S.C. 154(b) by 0 days.

(21) Appl. No.: 09/743,026

(22) PCT Filed: Jun. 25, 1999

(86) PCT No.: PCT/GB99/01995

§ 371 (c)(1),
(2), (4) Date: Jan. 4, 2001

(87) PCT Pub. No.: WO00/02297

PCT Pub. Date: Jan. 13, 2000

(30) Foreign Application Priority Data

Jul. 7, 1998 (GB) .............................................. 9814724
Sep. 22, 1998 (GB) .............................................. 9820606

(51) Int. Cl.[7] ................................................ H01R 4/00
(52) U.S. Cl. ....................................... 174/88 R; 174/93
(58) Field of Search ............................ 174/88 R, 73.1, 174/74 R, DIG. 8, 84 R, 77 R, 93; 138/178, 140

(56) References Cited

U.S. PATENT DOCUMENTS 4,832,248 A * 5/1989 Soni et al. ......... 174/DIG. 8 X

FOREIGN PATENT DOCUMENTS

| EP | 0 152 213 A | 8/1985 |
| WO | WO 91/00601 | 1/1991 |
| WO | WO 92/11675 | 7/1992 |
| WO | WO 94/16485 | 7/1994 |

OTHER PUBLICATIONS

Copy of International Search Report Sep. 1999.
Copy of International Preliminary Examination Report Aug. 2000.

* cited by examiner

*Primary Examiner*—Chau N. Nguyen
(74) *Attorney, Agent, or Firm*—Myers, Bigel, Sibley & Sajovec, P.A.

(57) ABSTRACT

Articles and methods are provided for enclosing an elongate substrate. A container is provided which is configured to receive the elongate substrate. A first polymeric sealing material having a first softening point and a first melt viscosity is positioned in the container. A second polymeric sealing material is positioned in the container between the first sealing material and an end of the container. The second sealing material has a second softening point lower than the first softening point and a second melt viscosity lower at a defined temperature than the fist melt viscosity.

24 Claims, 5 Drawing Sheets

METHODS AND ARTICLES FOR ENCLOSING AN ELONGATE SUBSTRATE USING POLYMERIC SEALING MATERIALS WITH DIFFERENT SOFTENING POINTS AND MELT VISCOSITIES

RELATED APPLICATIONS

The present application is a National Phase application of PCT/GB99/01995 filed on Jun. 25, 1999 and published in English which claims priority from Application GB 9820606.3 filed on Sep. 22, 1998 and Application GB 9814724.2 filed Jul. 7, 1998.

FIELD OF THE INVENTION

The present invention relates to the enclosing and sealing of elongate substrates, for example electrical or telecommunications cables, and especially joints between such cables.

BACKGROUND OF THE INVENTION

WO 91/00601 (Raychem) discloses a joint closure for an electrical cable. The closure comprises a heat-recoverable fabric sleeve wrapped around a sealing mastic, the ends of the sleeve being secured with a closure member. Two sealing materials may be used in such a closure, one material acting as a blocking material having both a higher viscosity at room temperature and a melt viscosity which is higher than the viscosity of the other material.

SUMMARY OF THE INVENTION

According to a first aspect, the invention provides an article for enclosing an elongate substrate, the article comprising a container at least in use, a first sealing material and a second sealing material, such that the first sealing material is located between the second sealing material and an end of the container, characterised in that both sealing materials are polymeric and in that the first sealing material has a higher softening point and a higher melt viscosity at a defined temperature than the second sealing material.

According to a first aspect, the invention provides an article for enclosing an elongate substrate, the article comprising a container containing, at least in use, a first sealing material and a second sealing material, such that the first sealing material is located between the second sealing material and an end of the container, characterised in that both sealing materials are polymeric and in that the first sealing material has a higher softening point and a higher melt viscosity at a defined temperature than the second sealing material.

According to a second aspect, the invention provides a method of enclosing an elongate substrate, the method comprising the steps of:

a) placing first and second sealing material on the substrate; and b) placing a container around the first and second sealing material and around the substrate, such that the first sealing material is located between the second polymeric sealing material and an end of the container;

which method is characterised in that both sealing materials are polymeric and in that the first sealing material has a higher softening point and a higher melt viscosity at a defined temperature than the second sealing material.

Preferably, there are at least two portions of the first polymeric sealing material. At least in use, at least one portion of the first polymeric sealing material is preferably placed on each opposite side of the second polymeric sealing material, on the elongate substrate.

According to a third aspect, the invention provides an article for enclosing an elongate substrate, comprising:

(a) a container; and (b) a polymeric sealing material;

at least in use, the polymeric sealing material being located within the container.

According to a fourth aspect, the invention provides a method of enclosing an elongate substrate, comprising:

(a) placing a polymeric sealing material on the substrate; and (b) placing a container around the polymeric sealing material and the substrate.

In use, the polymeric sealing material is preferably heated, preferably to above 100° C., to cause it to melt and to flow, and to conform closely to the substrate.

In some embodiments, the polymeric sealing material may be curable. In such embodiments, the invention preferably further comprises a curing agent for curing the polymeric sealing material. The curing agent may be part of the polymeric sealing material, or intimately mixed with the sealing material, or it may be separate from the sealing material. The curing agent may, for example, be present in the form of pellets, contained in microcapsules, provided as a layer on the sealing material or be provided in or on another component, e.g. a sheet, a bag, or a mesh. If the curing agent is not provided as part of, or intimately mixed with, the sealing material, it preferably becomes mixed with the sealing material during heating.

The polymeric sealing material may be separate from the container, e.g. in the form of a layer. The sealing material, or at least a portion of it, may however be provided on an inner surface of the container, e.g. as a layer. In this case, steps (a) and (b) of the methods according to the invention may be one and the same step, i.e. placing on the substrate a container which has polymeric sealing material (e.g. a layer of polymeric sealing material) on an inner surface thereof.

For the avoidance of doubt, it should be understood that any or all features of each aspect of the invention may be combined with any or all features of any or all other aspects of the invention.

The container is preferably dimensionally-recoverable, e.g. dimensionally-shrinkable. It is especially preferred for the container to be dimensionally heat-recoverable. The container may, for example, be in the form of a tube or a sleeve. It may be in the form of a sheet or the like which may be wrapped around the elongate substrate, e.g. it may be a so-called wraparound sleeve. The wraparound sleeve preferably has closure rails along opposite longitudinal edges, and a separate channel component by means of which the wrapped sleeve is retained in a closed configuration during use.

Once the container has been placed (e.g. wrapped) around the elongate substrate, it is preferably then heated (e.g. by means of a torch flame or by hot air) in order to cause it to recover around the substrate. This heating preferably causes the or each polymeric sealing material to melt and to flow, and to conform closely to the substrate. Once the container has been recovered, the polymeric sealing material preferably substantially fills the volume between the container and the substrate, leaving substantially no gaps.

According to the first and second aspects of the invention, there is a first polymeric sealing material which has a relatively high softening point and/or a relatively high melt viscosity at a defined temperature, and there is a second polymeric sealing material which has a relatively low softening point and/or a relatively low melt viscosity at said defined temperature. (These physical characteristics of each material are "high" or "low" relative to the corresponding values of the other material.) The softening point of the first polymeric sealing material is preferably at least 80° C., more preferably at least 85° C., e.g. at least 88° C. The softening point of the second polymeric sealing material is preferably lower than 80° C., more preferably lower than 78° C., e.g. lower than 76° C. The relative melt viscosity of each sealing material is preferably as measured at 100° C., and at this temperature the melt viscosity of the first polymeric sealing material is preferably at least 100 Pas (Pascal seconds), more preferably at least 150 Pas. At the same temperature, the viscosity of the second polymeric sealing material is preferably lower than 60 Pas, more preferably lower than 50 Pas.

The softening points of the sealing materials are preferably as measured in accordance with ASTM standard test method E28-97 ("Softening Point of Resins by Ring-and-Ball Apparatus"). The melt viscosities of the sealing materials are preferably as measured in accordance with ASTM standard test method D-3236-88, using a Brookfield model HBT viscometer, and spindle SC-27.

The use of two polymeric sealing materials with different softening points and/or different melt viscosities has the advantage that two conflicting requirements can be met, namely that the sealing material should flow and conform closely to the substrate during the heating operation, but that it should not escape from the container before it has solidified. The first polymeric sealing material preferably acts as a dam to prevent the more fluid molten second polymeric sealing material from flowing out of the container. Preferably each longitudinal end of the container (e.g. sleeve) has a quantity of the first sealing material to block the escape of the more centrally located second sealing material.

The polymeric sealing material may be provided in the form of blocks, sheets, or the like. Alternatively it may be in the form of pellets or in some other particulate or loose form. The sealing material may be contained in or retained by a delivery system, e.g. such as one or more bags, pouches, meshes or the like. It is particularly preferred for the sealing material to be supplied in the form of pellets contained in one or more mesh bags or pouches. If more than one bag or pouch is used, they may be separate or joined together. When the sealing material is melted, it preferably flows through the mesh and into intimate contact with the substrate. The mesh is preferably formed from a polymeric material, which preferably has been cross-linked so that it does not melt when the sealing material is heated.

The polymeric sealing material preferably comprises polyamide. Preferred polyamides are based on dimerised fatty acids and/or aliphatic amines. If a curing agent is used, this is preferably an epoxy material. However, other curing agents may be used, e.g. peroxides or acrylate terminated prepolymers (e.g. such as polyurethanes or polyesters etc). The sealing material may, for example, be acid terminated or amine terminated. If the sealing material is amine terminated it will normally react quickly with an epoxy curing agent, and therefore the curing agent is preferably kept separate from the sealing material until the sealing material needs to be cured.

Other polymeric sealing materials may be used, for example: polyethylene waxes; functionalized polyethylene waxes; polyethylene copolymers (e.g. ethylene vinyl acetates and/or ethylene butyl acetates); polyurethanes.

As already mentioned, the polymeric sealing material may be supplied as a layer, more preferably on an inner surface of the container. The layer of sealing material may be continuous, but preferably it is discontinuous. The layer preferably includes a plurality of discontinuities, e.g. gaps, holes, indentations, recesses, protrusions or the like. For example, the layer may comprise a series of strips or blocks, e.g. separated by gaps. Additionally or alternatively it may comprise a series of alternating protrusions and recesses, e.g. ridges and valleys. The layer may comprise an array of holes, gaps or recesses, and/or protrusions or the like.

The inventors have found that there are two main advantages to the layer of sealing material being discontinuous. Firstly, it may assist the placing of the container around the substrate, particularly when the container is in the form of a wraparound sleeve (e.g. the discontinuities in the layer may enable the container to retain its flexibility when this is desired). Secondly, it may enhance the ability of the sealing material to melt, flow, and conform around the substrate. This may, at least in part, be due to an increase in the surface area of the sealing material which the discontinuities may provide, and/or it maybe due to the shape or arrangement of the sealing material facilitating the speed of its melting and its ability to flow adequately.

The sealing material may be shaped in any of a variety of ways. It may, for example be extruded or moulded. Another possible method is to coat the sealing material onto the container, e.g. by pouring, injecting or spraying the sealing material onto the container. If the sealing material is shaped before it is applied to the container, it is preferably subsequently bonded to the container, e.g. by heat bonding.

If the sealing material is in the form of a layer, its thickness (prior to being melted and conforming around the substrate) is preferably no greater than 4.0 cm, more preferably no greater than 3.0 cm, especially no greater than 2.0 cm. The thickness of the layer is preferably at least 0.5 cm, more preferably at least 0.7 cm, especially at least 1.0 cm. The precise thickness of the layer, and if there is more than one layer, the number of layers, will be determined by the skilled person according to the particular requirements, especially the size and shape of the substrate, and the volume to be filled.

The invention is preferably used for enclosing and sealing a cable, e.g. an electrical cable or a telecommunications cable. More preferably, it is used for enclosing and sealing a joint or splice between two or more such cables. The invention is particularly suitable for enclosing a low voltage electrical power cable joint, especially a so-called branch-off joint. The joint may comprise a plurality of connections, or a single connector block, for example. Preferably the joint is substantially entirely encapsulated in the polymeric sealing material, preferably with substantially no voids or gaps. If a dimensionally-recoverable container (e.g. a heat-shrinkable sleeve) is used, the recovery of the container will normally drive the polymeric sealing material into any gaps, and cause it to conform closely to the substrate such that it is completely encapsulated in the sealing material. Another important advantage in using a heat-shrinkable sleeve is that after the sleeve has been heated (and shrunk) and is cooling down, re-crystallization of the sleeve material normally occurs, which generally causes extra shrinkage of the sleeve. The temperature range in which this normally occurs is about 85–100° C., at which temperatures at least some, and normally substantially all, of the polymeric sealing material will generally still be molten (since the re-crystallization or hardening temperature is often lower than the softening temperature). This means that as the sleeve cools down and the polymeric sealing material begins to harden (but before most of it has hardened) the sleeve continues to drive the sealing material into any gaps or voids in and around the substrate. This generally ensures a void-free encapsulation of the substrate. In embodiments of the invention which are electrical power cable joint closures, the closure preferably meets the Cenelec load-cycling specification HD623 for "Joints, stop ends and outdoor terminations for distribution cables of rated voltage 0.6/1 Kv". This specification defines a standard procedure for testing the sealing and insulation reliability of low voltage joint closures and terminations. The test comprises a series of "load cycles" in which the electrical cables of the joint have electrical current passed through them in order to raise the temperature of the conductors to between 5 and 10° C. above the maximum rated temperature of the cables. (The maximum rated temperature of PVC insulated cables is 70° C., and for polyethylene insulated cables it is 90° C.) Each cycle comprises a two hour period during which this elevated temperature is maintained, after which the electrical current is switched off and the conductors are allowed to cool to within 10° C. of the ambient temperature within a period of not less than three hours. The entire test comprises 63 such load cycles with the joint closure in air, followed by 63 load cycles with the joint closure immersed in water (with a water head of 1 m). In order to pass the test, after the load cycling the electrical conductors must withstand a specified a.c. test voltage, and the insulation resistance (according to a specified test) must be at least 50 MΩ. This Cenelec specification is a rigorous test, and the present inventors have found that by making a joint closure in accordance with the invention, the requirements of the specification may normally be achieved. In particular, by using the first and second polymeric sealing materials (as defined herein) it has been found that the stringent load cycling test for polyethylene insulated cables can normally be passed.

BRIEF DESCRIPTION OF THE DRAWINGS

The invention will now be described, by way of example, with reference to the accompanying drawings, of which.

DETAILED DESCRIPTION OF THE ILLUSTRATED EMBODIMENTS

Figure 1:
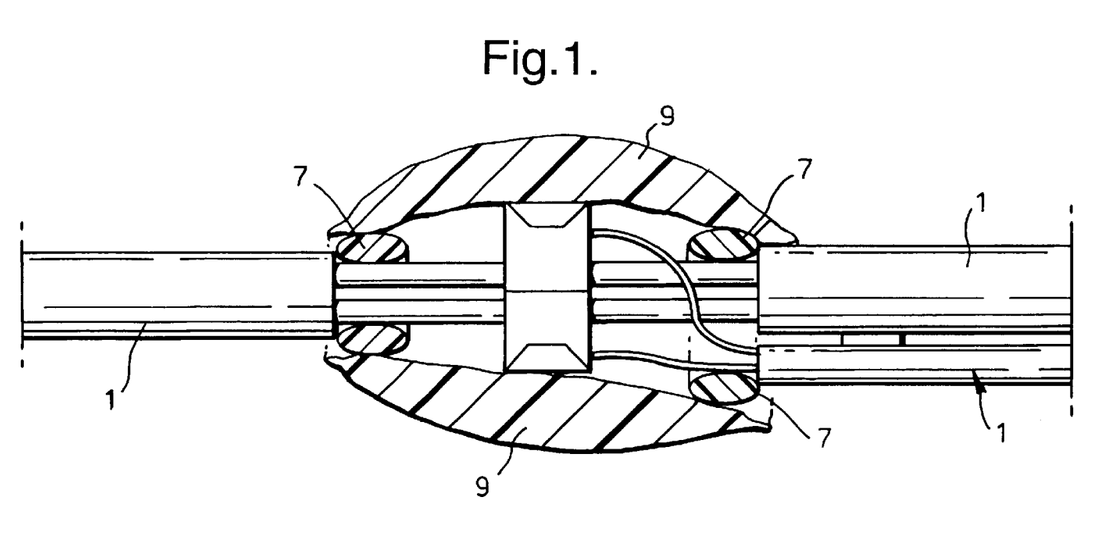
FIG. 1 is a schematic representation of an electrical cable branch joint, showing polymeric sealing material placed on the joint according to the invention prior to being melted.
Figure 2:
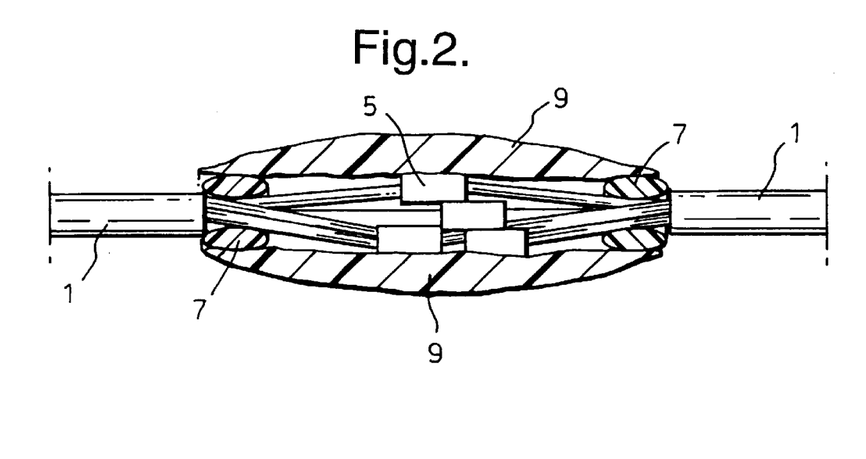
FIG. 2 is a schematic representation of another type of electrical cable joint, showing polymeric sealing material placed on the joint according to the invention prior to being melted.

FIGS. 1 and 2 are schematic representations of low voltage electrical cable joints between electrical cables 1. In FIG. 1, the electrical connections are made by means of a unitary connector block 3, whereas in FIG. 2, individual connections are made by connectors 5. Each design poses a different, but significant, problem with regard to how it may be enclosed and sealed. In each case, however, the invention enables the joint to be fully encapsulated and sealed substantially without the presence of voids or gaps, through which moisture or other contaminants might ingress. The complete exclusion of water and other contaminants from the exposed conductors of the joint area is crucial for the safe performance of the cables and the joint.

Also shown in FIGS. 1 and 2 are a first polymeric sealing material 7 and a second polymeric sealing material 9. The first polymeric sealing material 7 has a higher softening point and a higher melt viscosity at 100° C. than does the second polymeric sealing material 9. Both sealing materials comprise polyamide. The sealing materials are provided in separate bags made from a mesh of cross-linked polymer material. In each joint there are two separate portions of the first sealing material 7, which are wrapped around the cables at opposite longitudinal ends of the joint region. A single larger bag of the second sealing material 9 is wrapped around the joint. Subsequently (and not shown) a heat-recoverable sleeve would be placed around the sealing materials and the joint and heated causing the sleeve to recover and the sealing materials to melt and flow out of the mesh bags. Because the first sealing material 7 has a higher softening point and a higher melt viscosity than does the second sealing material 9, it does not melt as quickly as the second sealing material, nor, when it does melt does it become as fluid. It therefore acts as a dam to prevent the molten second sealing material escaping from the ends of the sleeve during recovery, and it does not itself escape. Because the second sealing material melts sooner and is less viscous, it is able to flow into and around the cable joint, ensuring that it becomes fully encapsulated without the presence of any voids through which water or other contaminants could pass and cause the failure of the joint.

Figure 3:
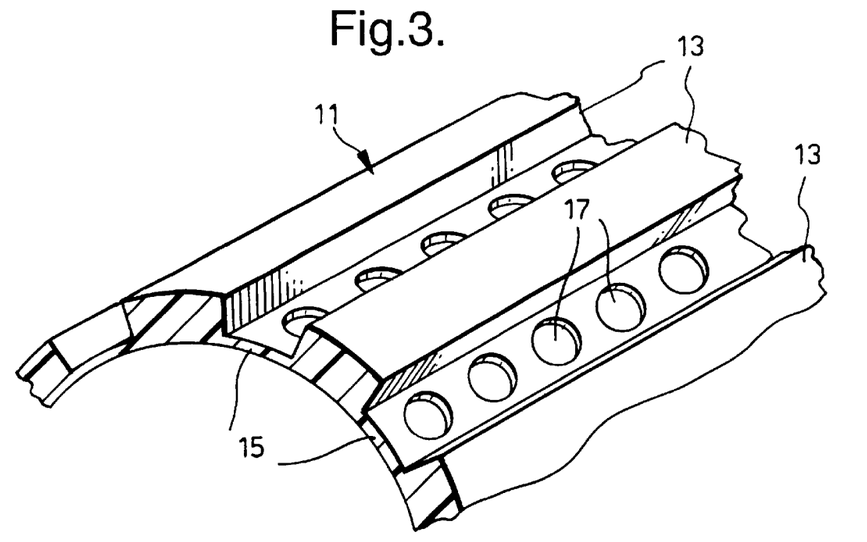
FIG. 3 is a sketch of a layer of polymeric sealing material according to the invention.
Figure 4:
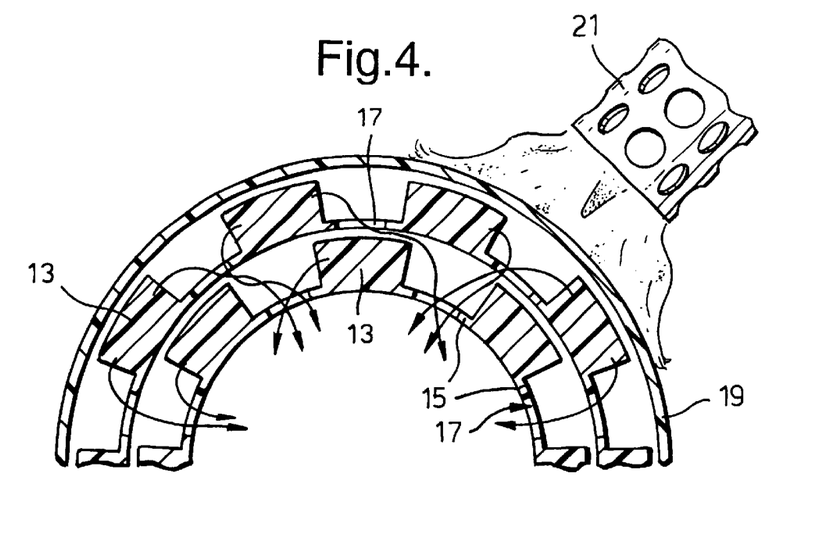
FIG. 4 is a sketch of two layers of polymeric sealing material of the type shown in FIG. 3 inside a heat-recoverable sleeve which is being heated by means of a heating torch.

FIG. 3 is a sketch of a layer 11 of polymeric sealing material which has been formed by extrusion (in fact only part of the layer is shown, for clarity). The layer 11 comprises a plurality of longitudinally-extending relatively thick portions 13, each of which is separated from its neighbours by a longitudinally-extending relatively thin portion 15. Each thick portion 13 has a thickness of about 1.0 cm, and each thin portion 15 has a thickness of about 0.2 cm. Furthermore, each thin portion 15 has a series of holes 17 extending through it. This construction has several advantages: firstly, the thin portions give the layer sufficient flexibility to enable it to be wrapped around a substrate (such as a cable joint); secondly, because of the presence of the thick portions of sealing material, it provides a substantial amount of sealing material, so as to ensure that the substrate may be properly encapsulated; and thirdly, its shape and large surface area ensure that the sealing material melts quickly and is able to flow efficiently. This latter feature is illustrated schematically in FIG. 4 which shows an article according to the invention, comprising a heat-recoverable sleeve 19 and two concentrically-arranged layers 11 of sealing material being heated by a heating torch 21. The arrows illustrate the efficient manner in which the initial portions of sealing material to melt can flow towards the centre of the article through the holes 17.

Figure 5:
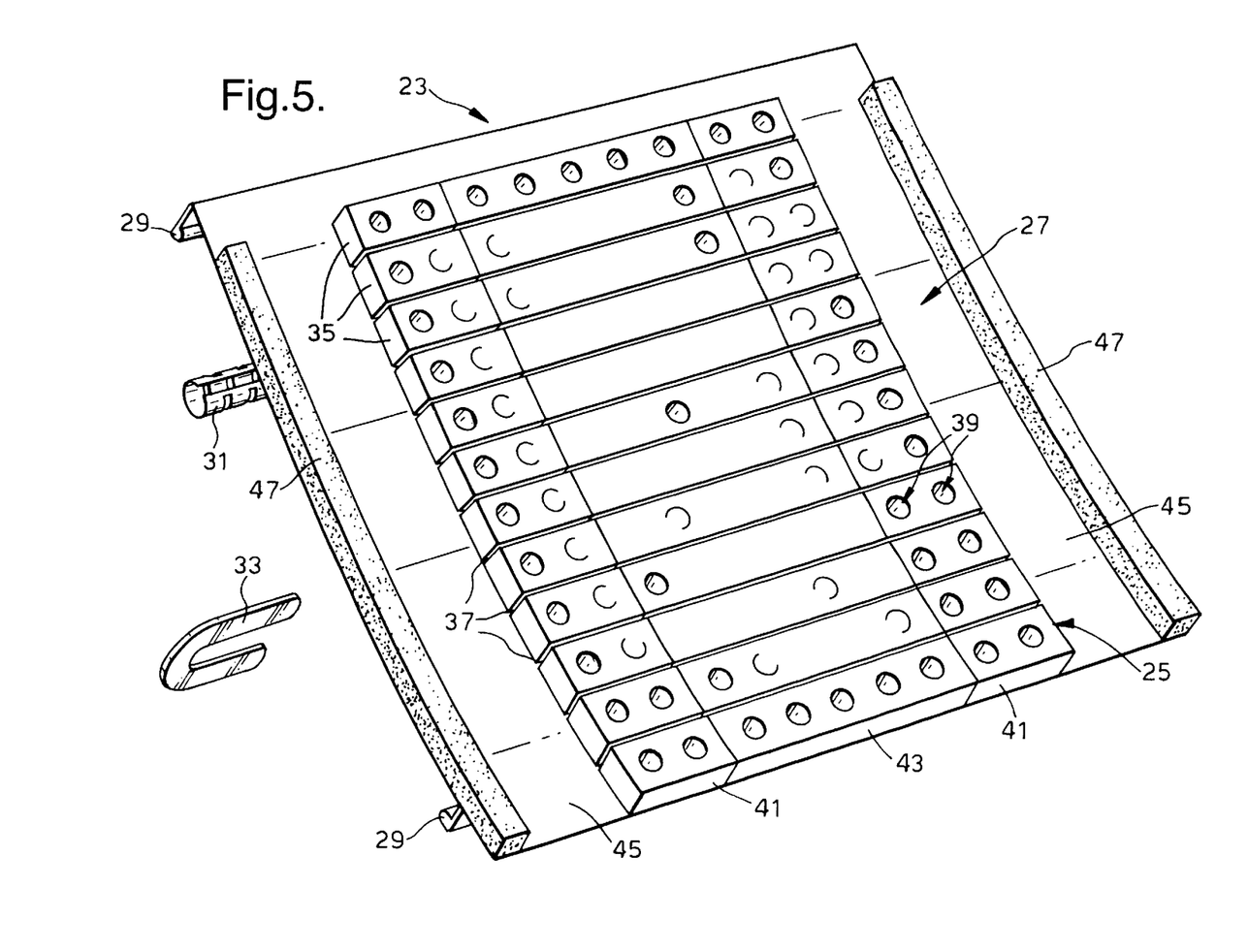
FIG. 5 is a sketch of a wraparound heat-recoverable sleeve which has a layer of polymeric sealing material on its inner surface, according to the invention.

FIG. 5 is a sketch of a wraparound heat-recoverable sleeve 23 which has a discontinuous layer 25 of polymeric sealing material on its inner surface 27. The sleeve itself includes conventional features such as closure rails 29, a closure channel 31, and a break-out clip 33 for pinching the sleeve between the cables. However, the layer 25 of polymeric sealing material is not conventional. In this embodiment, the layer comprises a series of longitudinally-extending strips 35 of sealing material, each of which is separated from its neighbour by a gap 37. Furthermore, each strip 35 of sealing material has a series of holes 39 extending through its thickness. The thickness of each strip 35 is about 13 mm, its width is about 40 mm, the diameter of each hole 39 is about 15 mm, and each gap 37 is about 3 mm wide.

Each strip 35, and consequently the entire layer 25, actually comprises two different sealing materials. The end regions 41 of each strip are formed from a first polymeric sealing material (a polyamide) having a relatively high softening point and a relatively high melt viscosity at 100° C., and the longitudinally-central region 43 of each strip is formed from a second polymeric sealing material (a polyamide) having a relatively low softening point and a relatively low melt viscosity at 100° C. Beyond the ends of each strip are regions 45 of the inner surface of the sleeve which either contain no sealing material or only a very thin layer of sealing material. At each longitudinal extremity of the inner surface 21 of the sleeve 23, are circumferential strips of polymer foam material 47, which prevent the escape of the sealing material from the ends of the sleeve during heat shrinkage, but which also permit air venting during this process.

Figure 6:
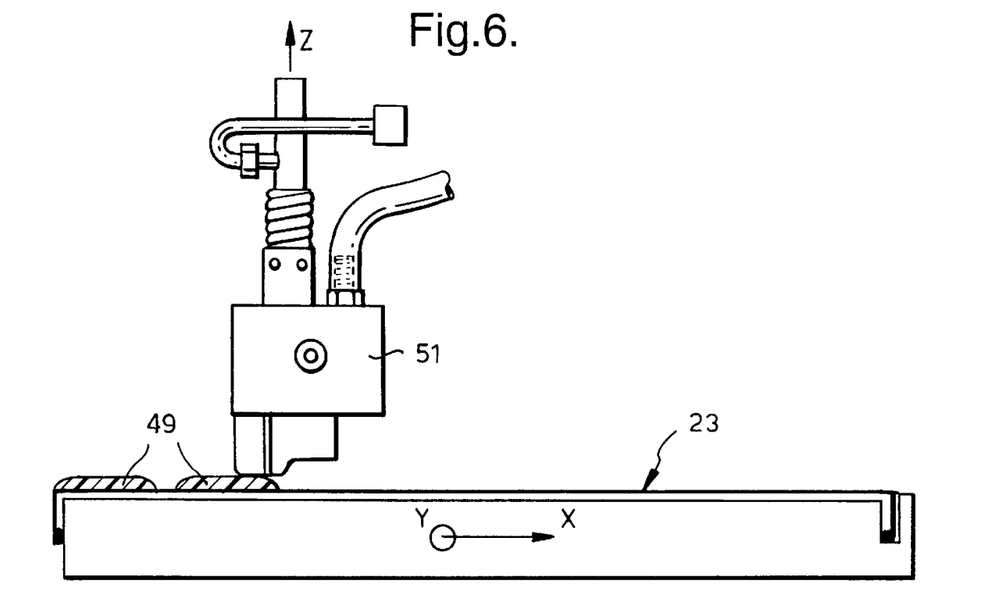
FIG. 6 is a sketch showing a discontinuous layer of polymeric sealing material being applied to an inner surface of a wraparound heat-recoverable sleeve according to the invention.
Figure 7:
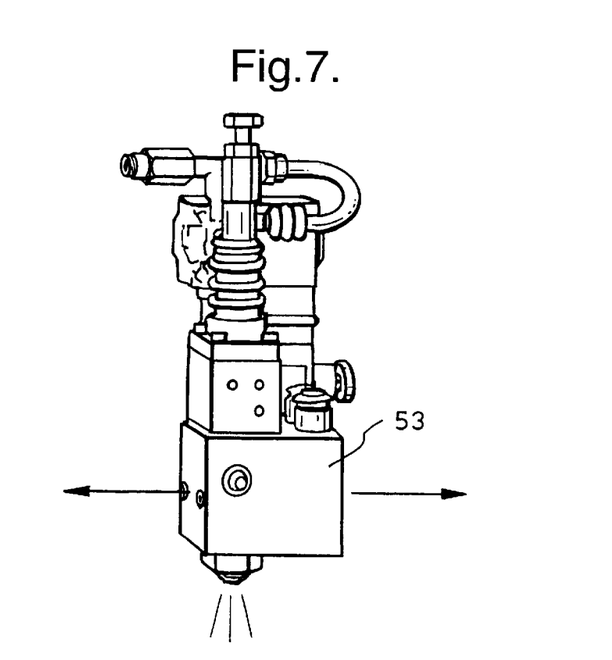
FIG. 7 is a sketch of a dispensing gun for applying polymeric sealing material to an inner surface of a container according to the invention.

FIG. 6 is a sketch showing a discontinuous layer of polymeric sealing material 49 being applied (in molten form) to an inner surface of a wraparound heat-recoverable sleeve 23. The molten sealing material is being applied by a dispensing gun 51 which is movable (e.g. robotically) in the x-y plane shown. FIG. 7 shows a slightly different method of applying the sealing material, i.e. by spraying it from a movable dispensing gun 53.

Figure 8:
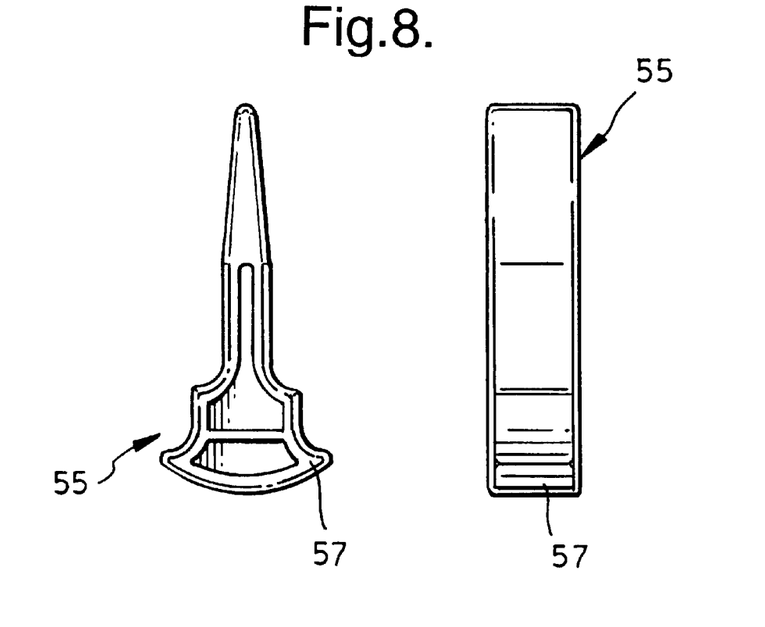
FIG. 8 is a drawing of a wedge for separating the conductors of an electrical cable.
Figure 9:
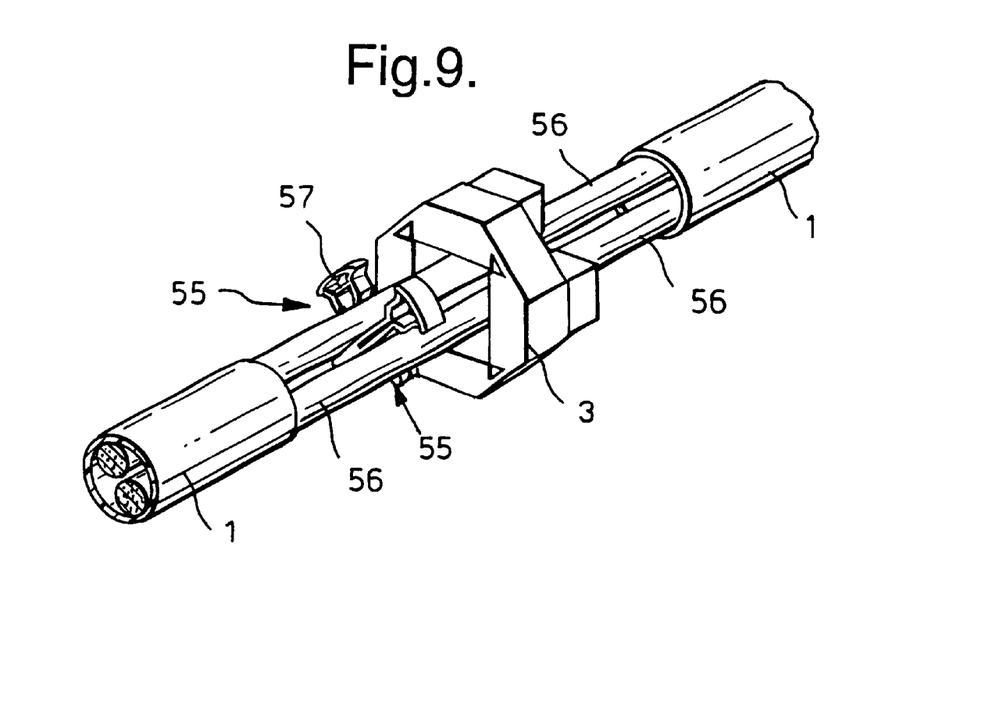
FIG. 9 is a schematic representation of a joint region between two multi-conductor electrical cables, with wedges as shown in FIG. 7 inserted between the conductors.

FIG. 8 is a drawing of a wedge 55 for insertion between conductors 56 of a multi-conductor cable (shown in FIG. 9). The wedge 55 is shaped to separate the conductors 56, i.e. to provide a gap between them, so as to facilitate the flow of polymeric sealing material between the conductors. Preferably at least two wedges are provided, since most cables comprise four conductors. Two wedges are preferable inserted generally at right angles to each other, so as to space apart each of the four conductors, as shown in FIG. 9.

The or each wedge preferably has a prominent head, e.g. as illustrated (reference numeral 57) which preferably remains proud at the conductors when the wedge is inserted between them. This may have several advantages. Firstly, it may substantially prevent the polymeric sealing material from coming into contact with the conductors until the sealing material has been heated sufficiently to ensure that it flows adequately between the conductors. This separation generally prevents the conductors quenching the heat from the sealing material during the heating process. Secondly, the profiles of the heads of the wedges will normally be visible from the exterior of a heat-recoverable sleeve once the sleeve has been recovered around the joint, and therefore there will be a visible indication that the wedges have been installed (this is a safeguard against incorrect installation). Thirdly, the head of at least one wedge may, for example, include a temperature indicator to indicate when the conductors have been pre-heated sufficiently (for installation procedures in which the cable conductors are pre-heated).

The temperature indicator may, for example, comprise a heat-flowable substance, e.g. wax, which is contained in the head but which will flow out of an orifice in the head when it melts.

The or each wedge may include, e.g. as a coating, polymeric sealing material and/or a curing agent.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An article for enclosing an elongate substrate, the article comprising a container containing a first sealing material and a second sealing material the first sealing material located between the second sealing material and an end of the container and wherein both of the sealing materials are polymeric and wherein the first sealing material has a higher softening point and a higher melt viscosity at a defined temperature than the second sealing material;

wherein the sealing materials are in the form of a discontinuous layer carried on a surface of the container which will face inwards in use; and wherein the discontinuous layer comprises substantially parallel strips having portions of the first material at ends of each strip and the second material between the portions of the first material.

2. An article for enclosing an elongate substrate, the article comprising a container containing a first sealing material and a second sealing material the first sealing material located between the second sealing material and an end of the container and wherein both of the sealing materials are polymeric and wherein the first sealing material has a higher softening point and a higher melt viscosity at a defined temperature than the second sealing material; and wherein the sealing materials are in sheet-like form having at least one of a variable thickness and apertures therein.

3. An article according to claim 2 wherein a maximum thickness of the sealing materials is not more than 4 cm.

4. An article according to claim 2 wherein a maximum thickness of the sealing materials is at least 0.5 cm.

5. An article according to claim 4 wherein the elongate substrate comprises a low-to-medium voltage power cable joint.

6. An article for enclosing an elongate substrate, the article comprising a container containing a first sealing material and a second sealing material the first sealing material located between the second sealing material and an end of the container and wherein both of the sealing materials are polymeric and wherein the first sealing material has a higher softening point and a higher melt viscosity at a defined temperature than the second sealing material;
   wherein the sealing materials are provided in pellet form contained in mesh bags which are wrapped around the elongate substrate before application of the container thereto; and
   wherein the mesh bags remain unmelted at temperatures used to soften the sealing materials.

7. An article for enclosing an elongate substrate, the article comprising a container containing a first sealing material and a second sealing material the first sealing material located between the second sealing material and an end of the container and wherein both of the sealing materials are polymeric and wherein the first sealing material has a higher softening point and a higher melt viscosity at a defined temperature than the second sealing material; and
   wherein the container is a wraparound sleeve and has sealant-retaining members along its edges to control escape of the sealing materials from ends of the sleeve during heat-shrinkage.

8. An article for enclosing an elongate substrate, the article comprising a container containing a first sealing material and a second sealing material the first sealing material located between the second sealing material and an end of the container and wherein both of the sealing materials are polymeric and wherein the first sealing material has a higher softening point and a higher melt viscosity at a defined temperature than the second sealing material; and
   wherein the elongate substrate comprises an electrical cable having multiple cores, the article further comprising at least one wedge inserted between ones of the cores to separate them from one another, the at least one wedge having a protruding formation which is visible in outline through the container.

9. An article according to claim 8, wherein the container is heat-shrinkable and the protruding formation of the at least one wedge further comprises means for indicating adequate heating to shrink the container.

10. A method of enclosing an elongate substrate the method comprising:
    placing first and second polymeric sealing materials on the elongate substrate; and
    placing a container around the first and second polymeric sealing materials and around the substrate, such that the first polymeric sealing material is located between the second polymeric sealing material and an end of the container;
    wherein the first sealing material has a higher softening point and a higher melt viscosity at a defined temperature than the second sealing material;
    wherein the sealing materials are in the form of a discontinuous layer carried on a surface of the container which will face inwards in use; and
    wherein the discontinuous layer comprises substantially parallel strips having portions of the first material at ends of each strip and the second material between the portions of the first material.

11. A method of enclosing an elongate substrate the method comprising:
    placing first and second polymeric sealing materials on the elongate substrate; and
    placing a container around the first and second polymeric sealing materials and around the substrate, such that the first polymeric sealing material is located between the second polymeric sealing material and an end of the container;
    wherein the first sealing material has a higher softening point and a higher melt viscosity at a defined temperature than the second sealing material; and
    wherein the sealing materials are in sheet-like form having at least one of a variable thickness and apertures therein.

12. A method according to claim 11 wherein a maximum thickness of the sealing materials is not more than 4 cm.

13. A method according to claim 11 wherein a maximum thickness of the sealing materials is at least 0.5 cm.

14. A method according to claim 13 wherein the elongate substrate comprises a low-to-medium voltage power cable joint.

15. A method of enclosing an elongate substrate the method comprising:
    placing first and second polymeric sealing materials on the elongate substrate; and
    placing a container around the first and second polymeric sealing materials and around the substrate, such that the first polymeric sealing material is located between the second polymeric sealing material and an end of the container;
    wherein the first sealing material has a higher softening point and a higher melt viscosity at a defined temperature than the second sealing material; and
    wherein the sealing materials are provided in pellet form contained in mesh bags which are wrapped around the elongate substrate before application of the container thereto.

16. A method according to claim 15 wherein the mesh bags remain unmelted at the temperatures used to soften the sealing materials.

17. A method of enclosing an elongate substrate the method comprising:
    placing first and second polymeric sealing materials on the elongate substrate; and
    placing a container around the first and second polymeric sealing materials and around the substrate, such that the first polymeric sealing material is located between the second polymeric sealing material and an end of the container;
    wherein the first sealing material has a higher softening point and a higher melt viscosity at a defined temperature than the second sealing material; and
    wherein the container is a wraparound sleeve and has sealant-retaining members along its edges to control escape of the sealing materials from ends of the sleeve during heat-shrinkage.

18. A method of enclosing an elongate substrate the method comprising:
    placing first and second polymeric sealing materials on the elongate substrate; and
    placing a container around the first and second polymeric sealing materials and around the substrate, such that the first polymeric sealing material is located between the second polymeric sealing material and an end of the container;
    wherein the first sealing material has a higher softening point and a higher melt viscosity at a defined temperature than the second sealing material; and
    wherein the elongate substrate comprises an electrical cable having multiple cores, the article further comprising at least one wedge inserted between the cores to separate them from one another, the at least one wedge having a protruding formation which is visible in outline through the container.

19. A method according to claim 18, wherein the container is heat-shrinkable and the protruding formation of the at least one wedge further comprises means for indicating adequate heating to shrink the container.

20. An article for enclosing an elongate substrate, the article comprising:

a container configured to receive the elongate substrate;

a first polymeric sealing material having a first softening point and a first melt viscosity positioned in the container;

a second polymeric sealing material positioned in the container between the first sealing material and an end of the container, the second sealing material having a second softening point higher than the first softening point and a second melt viscosity higher at a defined temperature than the first melt viscosity;

wherein the self-supporting article further comprises a sheet of the at least one of the first polymeric sealing material and the second polymeric sealing material configured to be wrapped around the elongate substrate; and wherein the sheet of the at least one of the first polymeric sealing material and the second polymeric sealing material has at least one of a variable thickness and a plurality of apertures therein.

21. An article according to claim 20 wherein the defined temperature is about 100° Centigrade.

22. An article according to claim 20 wherein the container comprises a heat-recoverable sleeve.

23. An article for enclosing an elongate substrate, the article comprising:

a container configured to receive the elongate substrate;

a first polymeric sealing material having a first softening point and a first melt viscosity positioned in the container;

a second polymeric sealing material positioned in the container between the first sealing material and an end of the container, the second sealing material having a second softening point higher than the first softening point and a second melt viscosity higher at a defined temperature than the first melt viscosity; and wherein at least one of the first polymeric sealing material and the second polymeric sealing material comprises a pelletized polymeric material contained in a mesh bag, the mesh bag being configured to wrap around the elongate substrate and to be received within the container.

24. An article according to claim 23 wherein the mesh bags remain unmelted at the temperatures used to soften the sealing materials.

\* \* \* \* \*